United States Patent
Yamaguchi et al.

[11] Patent Number: 5,940,310
[45] Date of Patent: Aug. 17, 1999

[54] DEVICE, METHOD AND STORAGE MEDIUM FOR CALCULATING ELECTROMAGNETIC FIELD STRENGTH

[75] Inventors: Shinya Yamaguchi; Tomoyuki Nakao; Shinichi Ohtsu; Makoto Mukai, all of Kawasaki, Japan

[73] Assignee: Fujitsu Limited, Kawasaki, Japan

[21] Appl. No.: 08/969,659

[22] Filed: Nov. 13, 1997

[30] Foreign Application Priority Data

Apr. 30, 1997 [JP] Japan ..................... 9-112632

[51] Int. Cl.⁶ ............. G01R 29/08; G06F 9/455; G06F 17/50
[52] U.S. Cl. ............. 364/578; 364/489
[58] Field of Search ............. 364/578

[56] References Cited

U.S. PATENT DOCUMENTS

| | | | |
|---|---|---|---|
| 5,650,935 | 7/1997 | Nishino et al. | 364/481 |
| 5,812,434 | 9/1998 | Nagase et al. | 364/578 |
| 5,815,414 | 9/1998 | Funaki et al. | 364/578 |
| 5,835,979 | 11/1998 | Hiraki et al. | 174/33 |

FOREIGN PATENT DOCUMENTS

| | | |
|---|---|---|
| 7-302278 | 11/1995 | Japan . |
| 8-304492 | 11/1996 | Japan . |

OTHER PUBLICATIONS

Becker et al.: FDTD Modeling of Noise in Computer Packages; Multi–Chip Module Conference; IEEE; pp. 123–127, 1993.

Tanabe et al.: 3D–FEM Analysis of Electromagnetic Emission from PCB; Electromagnetic Compatability Symposium; IEEE; pp. 343–346, 1996.

Haw–Jyh et al.: Signal Integrity Issues at Split Ground and Power Planes; Electronic Components and Technology Conference; IEEE; pp. 752–755, 1996.

*Primary Examiner*—Kevin J. Teska
*Assistant Examiner*—Hugh Jones
*Attorney, Agent, or Firm*—Staas & Halsey

[57] ABSTRACT

A device accurately calculates the strength of an electromagnetic field radiated from an electric circuit apparatus having a data receiving unit, and extractor, a model generator, and a calculator. The data receiving unit receives structural data related to the electric circuit apparatus. The extractor exacts, from the received data, structural data related to a dielectric between a power source layer and a ground layer of a multilayer printed board. The generator refers to the structural data on the multilayer printed board, divides the power source layer and the ground layer into corresponding meshes of metal patches, vertically extends first and second conductive patches from the sides of the metal patches so that the conductive patches are not in contact with one another, arranges a capacitor between each pair of the first and second conductive patches, divides selected metal patches of the power source and ground layers to form two triangle patches, and arranges a noise source between the apexes of the triangle patches, thereby producing a model of the multilayer printed board. The calculator calculates the strength of an electromagnetic field radiated from the electric circuit apparatus according to the model of the multilayer printed board.

8 Claims, 14 Drawing Sheets

DEVICE, METHOD AND STORAGE MEDIUM FOR CALCULATING ELECTROMAGNETIC FIELD STRENGTH

BACKGROUND OF THE INVENTION

1. Field of the Invention

The present invention relates to a method of and a device for calculating the strength of an electromagnetic field radiated from an electric circuit apparatus using a moment method, and a storage medium for storing a program that simulates the device for calculating electromagnetic field strength. In particular, the present invention relates to a method of and a device for accurately constructing a model of a multilayer printed board installed in an electric circuit apparatus, and according to the model, correctly calculating the strength of an electromagnetic field radiated from the electric circuit apparatus, as well as a storage medium for storing a program that simulates the device for calculating electromagnetic field strength.

Many countries have regulations to restrict radiation of unnecessary radio waves and noise exceeding a predetermined level from electric circuit apparatuses.

To meet such regulations, shielding and filtering techniques are employed, and to quantitatively evaluate the radiation reducing effect of such shielding and filtering techniques, simulation techniques are needed.

The inventors of the present invention have developed simulation techniques for calculating the strength of an electromagnetic field radiated from an electric circuit apparatus according to the moment method. These techniques need an accurate model of a target electric circuit apparatus.

2. Description of the Related Art

When simulating the strength of an electromagnetic field radiated from an object, the electric and magnetic currents flowing through each part of the object must be found and substituted into known theoretical equations related to electromagnetic wave radiation. The electric and magnetic currents running through an object are theoretically obtained by solving Maxwell's electromagnetic wave equation under given boundary conditions.

The moment method is a technique to solve Maxwell's equation and provides one solution to an integral equation derived from Maxwell's equation. The moment method divides an object into small elements and calculates electric and magnetic currents flowing through the elements. The moment method is capable of handling a three-dimensional object having an arbitrary shape. The moment method is described in, for example, "Sinusoidal Reaction Formulation for Radiation and Scattering from Conducting Surface" by H. N. Wang, J. H. Richmond, and M. C. Gilreath, IEEE Transactions Antennas Propagation, Vol. AP-23, 1975.

The moment method converts the structure of a target electric circuit apparatus into a mesh of elements. After selecting a target frequency, the method calculates mutual impedance, mutual admittance, and mutual reaction among the elements, substitutes the calculated values and a wave source specified by structural data into simultaneous equations of the moment method, and solves the simultaneous equations, to find the electric and magnetic currents running through the elements.

When handling a metal object, the moment method divides the object into a mesh of elements, calculates mutual impedance $Z_{ij}$ among the elements, and solves the following simultaneous equations involving the mutual impedance $Zij$, wave sources $Vi$, and currents $Ii$ flowing through the metal elements:

$$[Zij][Ii]=[Vi]$$

Solving the simultaneous equations provides the currents $Ii$, which are used to calculate the strength of an electromagnetic field. In the above expression, "[]" indicates a matrix.

If each element of the mesh involves resistance, capacitance, and reactance, they are added to the self-impedance of the element.

For realizing high-density mounting, electric circuit apparatuses frequently employ a multilayer printed board, which is composed of a power source layer, a ground layer, and a signal layer that are laminated one upon another with insulating material being interposed between each pair of the adjacent layers.

FIG. 15A shows an example of the multilayer printed board. More precisely, the example consists of a first signal layer 20, a first core 21 made of, for example, glass epoxy resin, a first prepreg 22 made of insulating material for thickness adjusting and bonding purposes, a power source layer 23, a second core 24 made of, for example, glass epoxy resin, a ground layer 25, a second prepreg 26 made of insulating material for thickness adjusting and bonding purposes, a third core 27 made of, for example, glass epoxy resin, and a second signal layer 28. There are four metal layers 20, 23, 25, and 28 and five insulating layers 21, 22, 24, 26 and 27.

FIG. 15B shows circuit parts and chips mounted along circuit patterns on the first signal layer 20 or on the second signal layer 28, to form an electronic circuit. The circuit patterns are made of a metal, such as copper, foil. The electronic circuit is electrically connected to the power source layer 23 and ground layer 25 through vias or holes, so that the electronic circuit may be supplied with a power and be grounded.

The electronic circuit formed on each signal layer (20, 28) radiates a strong electromagnetic field.

When simulating a target electric circuit apparatus having such a multilayer printed board, the prior art ignores the dielectric existing between the power source layer and the ground layer of the multilayer printed board and replaces the power source and ground layers with metal layers having no thickness, thereby modeling the multilayer printed board.

An electronic circuit mounted on each signal layer, however, produces noise when it operates. The noise causes a high-frequency current to flow to the power source and ground layers. As a result, the dielectric existing between the power source and ground layers resonates and works as a microstrip antenna to radiate an electromagnetic field that cannot be ignored.

In FIG. 15A, the power source layer 23 supplies power to the first and second signal layers 20 and 28 through vias, and the ground layer 25 provides the signal layers 20 and 28 with ground potential through vias. As a result, a noise source is present between the layers 23 and 25 as shown in FIG. 16 depending on the operation of the electronic circuit.

The noise source causes a high-frequency current to flow between the power source layer 23 and the ground layer 25 as shown in FIG. 17. As a result, the dielectric existing between the layers 23 and 25 resonates, working as a microstrip antenna to radiate an electromagnetic field that is strong and cannot be ignored.

Due to a speedup in electronic circuits such as an MPU mounted on signal layers of a multilayer printed board, high-frequency currents running between power source and ground layers of the board cannot be ignored. This is because the currents cause a dielectric between the power source and ground layers to resonate and produce a strong electromagnetic field.

In spite of this, the prior art ignores the dielectric between the power source layer and the ground layer when modeling the multilayer printed board and replaces the power source and ground layers with metal plates having no thickness. Accordingly, it is impossible for the prior art to calculate the strength of an electromagnetic field radiated from the multilayer printed board due to the resonance of the dielectric.

SUMMARY OF THE INVENTION

An object of the present invention is to provide a method of and a device for correctly preparing a model of a multilayer printed board that is installed in an electric circuit apparatus and, according to the model, precisely calculating the strength of an electromagnetic field radiated from the electric circuit apparatus, as well as a storage medium for storing a program that simulates the device for calculating electromagnetic field strength.

To attain the above object, there is provided, according to an aspect of the present invention, a device for calculating the strength of an electromagnetic field radiated from an electric circuit apparatus by using a moment method. The device comprises a data receiving unit for receiving structural data relating to the electric circuit apparatus; an extraction unit for extracting, from the data receiving unit, structural data related to a dielectric sandwiched between a power source layer and a ground layer of a multilayer printed board; a model generating unit for generating, based on the structural data on the multilayer printed board, a model of the multilayer printed board; and a calculating unit for calculating, based on the model generated by the model generating unit, the strength of an electromagnetic field radiated from the electric circuit apparatus by using the moment method. The model generating unit comprises: a first mesh generating unit for generating a mesh of first metal patches generated by dividing the power source layer; a first conductive patch generating unit for generating first conductive patches each vertically extending from each side of each of the first metal patches toward the ground layer in such a way that the first conductive patches are not in contact with one another; a second mesh generating unit for generating a mesh of second metal patches by dividing the ground layer; a second conductive patch generating unit for generating second conductive patches each vertically extending from each side of each of the second metal patches toward the power source layer in such a way that the second conductive patches are not in contact with one another, and a slight gap is generated between each of the first conductive patches and the corresponding one of the second conductive patches; and a capacitor model generating unit for generating a capacitor model arranged between each pair of the first and the second conductive patches.

According to another aspect of the present invention, the model generating unit further comprises a noise source model generating unit for generating a noise source model. The noise source model is generated by dividing a specific one of the first metal patches to form triangle patches, by dividing a corresponding one of the second metal patches to form triangle patches, and by arranging a noise source between the apexes of the opposite triangle patches.

According to still another aspect of the present invention, the mode generating unit further comprises at least one of a resistance model generating unit and a reactance model generating unit respectively generating at least one of a resistance and a reactance connected in series with the capacitor model.

According to still further aspect of the present invention, the mode generating unit further comprises a bypass capacitor model generating unit generating a bypass capacitor model arranged between a specific pair of the first and the second conductive patches.

According to yet further aspect of the present invention, the calculation unit comprises a unit for assuming that each of the first metal patches and the second metal patches has a resistance component.

According to further aspect of the present invention, a method and a storage medium for realizing the above device are provided.

BRIEF DESCRIPTION OF THE DRAWINGS

The above object and features as well as other features of the present invention will be understood more clearly from the following description of the preferred embodiments when read in conjunction with the accompanying drawings, wherein.

DESCRIPTION OF THE PREFERRED EMBODIMENTS

Figure 1:
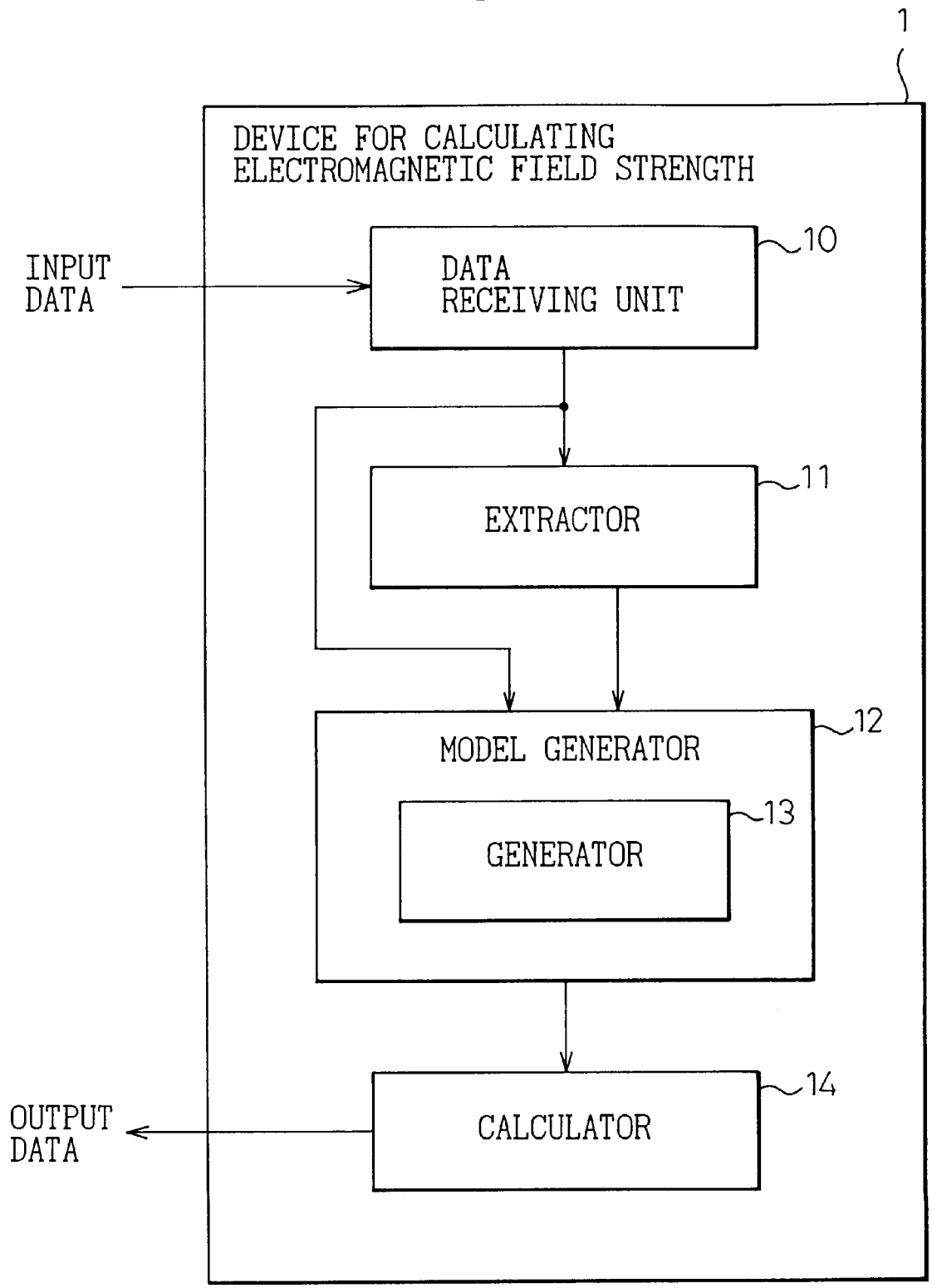
FIG. 1 shows the principle of the present invention.

FIG. 1 shows the principle of a device for calculating electromagnetic field strength according to the present invention.

The device 1 employs the moment method to calculate the strength of an electromagnetic field radiated from a target electric circuit apparatus.

The device 1 has a data receiving unit 10, an extractor 11, a model generator 12, a generator 13, and a calculator 14.

The data receiving unit 10 receives structural data on the target electric circuit apparatus. From the structural data, the extractor 11 extracts data on the structure of a multilayer printed board installed in the electric circuit apparatus. The board has a power source layer, a ground layer, and a dielectric layer sandwiched between them.

The model generator 12 generates a model of the electric circuit apparatus, to which the moment method is to be applied, based on the structural data provided by the data receiving unit 10. The generator 13 is developed in the model generator 12 and generates a model of the multilayer printed board, to which the moment method is to be applied, based on the structural data extracted by the extractor 11.

The calculator 14 calculates the strength of an electromagnetic field radiated from the electric circuit apparatus based on the model generated by the model generator 12 with the use of the moment method.

The function of the device 1 of calculating the strength of an electromagnetic field is materialized with a program. This program is provided with a medium, is stored in the device 1, and is executed in a memory, to thereby provide the effect of the present invention.

As mentioned above, the extractor 11 extracts structural data on the multilayer printed board. According to the structural data, the generator 13 divides the power source layer of the board into a grid of metal patches. For each of the metal patches, the generator 13 generates a first conductive patch that vertically extends from each side of the metal patch toward the ground layer in such a way that the first conductive patches are not in contact with one another. Similarly, the generator 13 divides the ground layer into a grid of metal patches that are identical to those of the power source layer. For each of the metal patches of the ground layer, the generator 13 generates a second conductive patch that vertically extends from each side of the metal patch toward the power source layer in such a way that the second conductive patches are not in contact with one another. Corresponding first and second conductive patches form a pair with a small gap being present between them. At this gap, the generator 13 forms a capacitor. Further, the generator 13 divides a specific one of the metal patches of the power source layer, to form a triangle patch. Similarly, the generator 13 divides a specific one of the metal patches of the ground layer, to form a triangle patch. Then, the generator 13 arranges a noise source or a wave source between the apexes of the two triangle patches, thereby completing the model of the multilayer printed board.

The generator 13 may connect the capacitor to one or both of resistance and reactance in series when forming the model. If there is a bypass capacitor between the power source layer and the ground layer, the bypass capacitor is arranged between a proper pair of the first and second conductive patches when forming the model.

Based on the model of the multilayer printed board, the calculator 14 calculates the strength of an electric field radiated from the electric circuit apparatus according to the moment method.

When calculating the electromagnetic field strength, the calculator 14 may assume that each of the metal patches of the power source and ground layers has a resistance component.

In this way, the device 1 of the present invention forms an accurate model of a multilayer printed board installed in a target electric circuit apparatus, and based on the model, correctly calculates the strength of an electromagnetic field radiated from the electric circuit apparatus according to the moment method.

Preferred embodiments of the present invention will be explained in detail.

Figure 2:
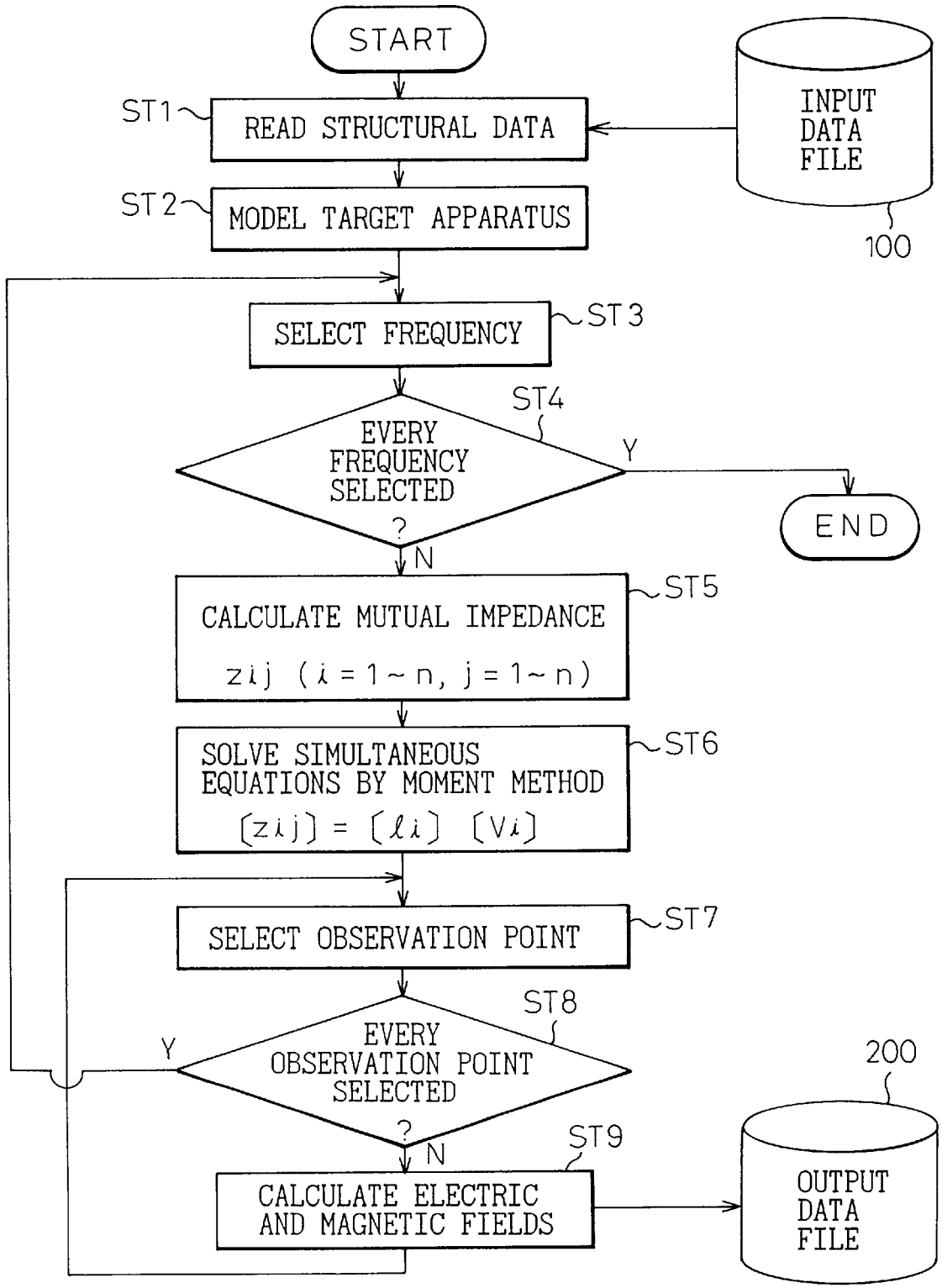
FIG. 2 is a flowchart showing a sequence of steps according to an embodiment of the present invention.

FIG. 2 is a flowchart showing a sequence of steps carried out by the device 1 (FIG. 1) of the present invention for calculating the strength of an electromagnetic field. An input data file 100 stores structural data of a dielectric between a power source layer and a ground layer on an electric circuit apparatus which is a subject to be analyzed (hereinafter referred to as a target electric circuit apparatus). The data file 100 also stores target frequencies at which the electric circuit apparatus is to be analyzed. An output data file 200 stores a calculated electromagnetic field strength.

At step ST1, the structural data on the target electric circuit apparatus is read from the input data file 100. Based on the structural data, at step ST2, the electric circuit apparatus is divided into meshes and a model is generated to which the moment method is to be applied. This modeling step will be explained later in detail with reference to FIG. 3.

At step ST3, one of unprocessed target frequencies is selected. At step ST4, it is determined whether or not all target frequencies stored in the input data file 100 have been selected. If all have been selected, the flow ends.

If any target frequency is not selected yet, i.e., if one target frequency is successively selected at step ST3, the process proceeds to step ST5 whereby Green's function is employed to calculate mutual impedance Zij (i =1 to n, j =1 to n) between the meshes. It is assumed for the sake of explanation that the target to be analyzed is made of metal, and therefore, only the mutual impedance is calculated.

At step ST6, the calculated mutual impedance Zij and a voltage Vi of a signal source specified by the structural data are used to solve the following simultaneous equations of the moment method:

$$[Z_{ij}][I_i]=[V_i]$$

Namely, currents Ii flowing through the meshes are calculated.

Then at step ST7, one of unprocessed observation points that are specified in advance is selected. At step ST8, it is determined whether or not all observation points have been selected. If all have been selected, the flow returns to step ST3 to execute the processes for the next frequency.

If there is any observation point that is not selected yet, i.e., if one observation point is successfully selected at step ST7, then at step ST9, the strength of an electromagnetic field produced at the selected observation point due to the currents Ii flowing through the meshes is calculated. A result of the calculation is stored in the output data file 200, and the flow returns to step ST7 to process the processes in the next observation point.

In this way, the device 1 of the present invention employs the moment method to calculate the strength of an electromagnetic field radiated from a target electric circuit apparatus.

Figure 3:
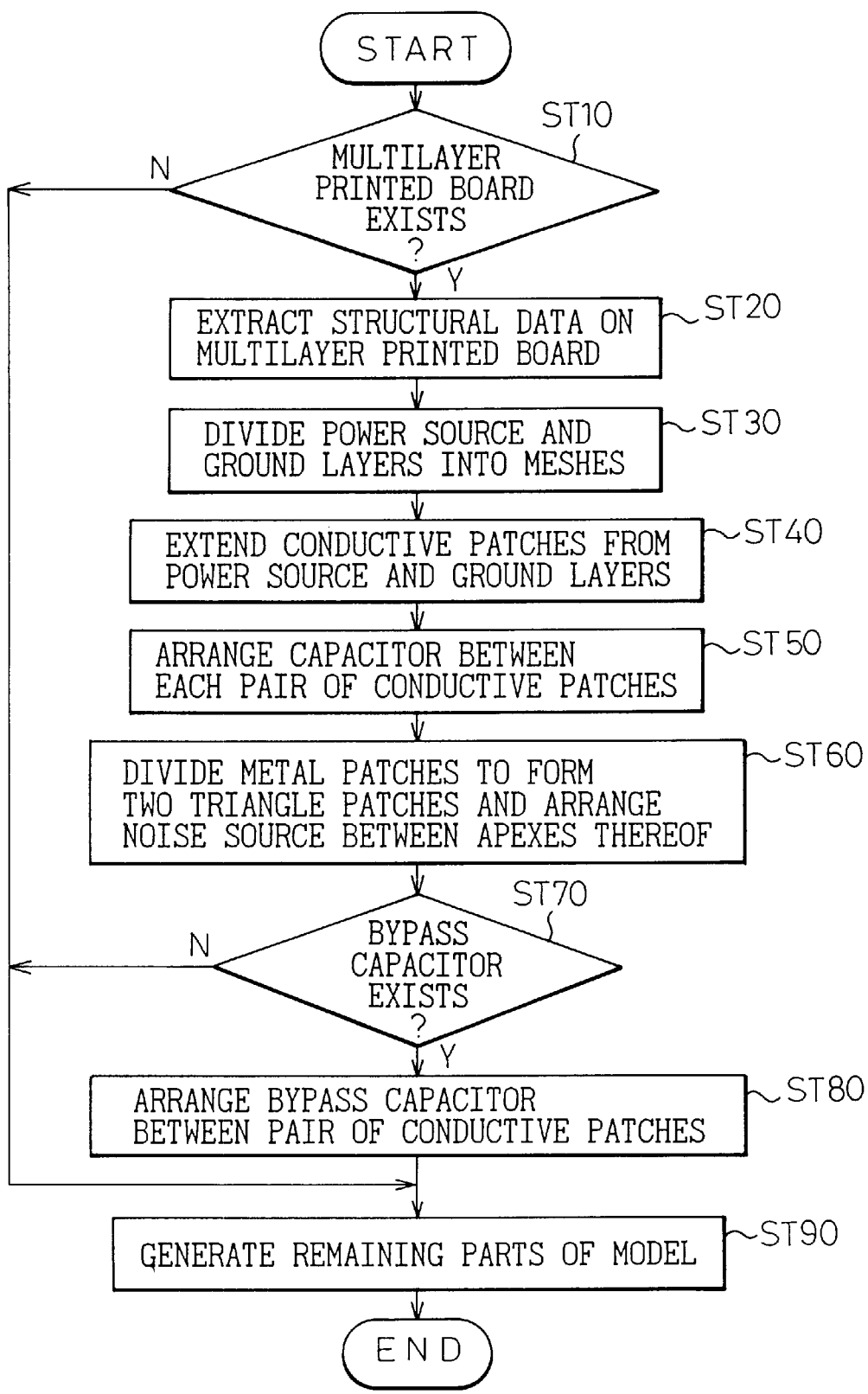
FIG. 3 is a flowchart showing the details of step 2 of FIG. 2.

FIG. 3 is a flowchart showing the details of the modeling step ST2 of FIG. 2.

In FIG. 3, at step ST10, the structural data on the target electric circuit apparatus is checked to see if the electric circuit apparatus has a multilayer printed board. If it has, at step ST20, structural data on the multilayer printed board is extracted.

According to the extracted data, at step ST30, a power source layer of the multilayer printed board is divided into a grid of metal patches, and a ground layer of the board is divided into a grid of metal patches that are identical to those of the power source layer.

Figure 4:
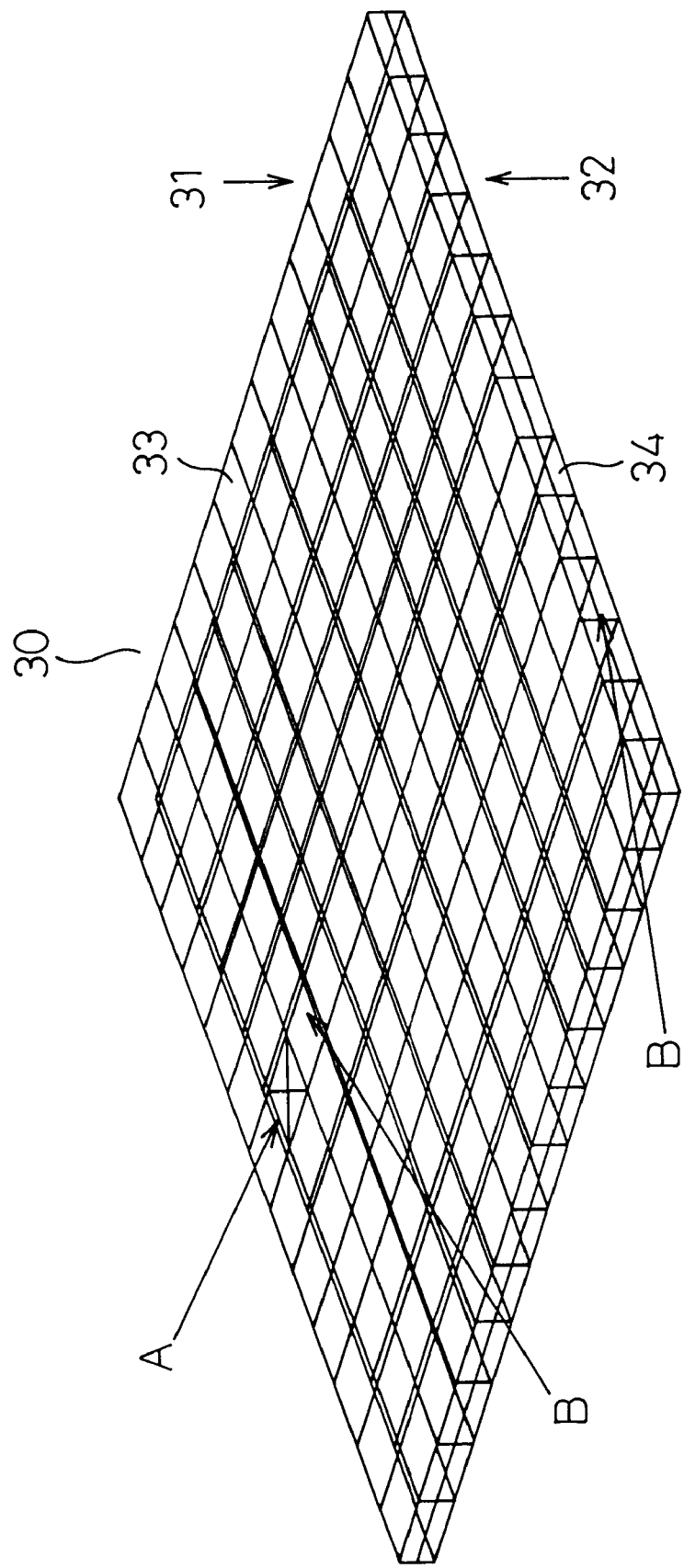
FIG. 4 shows a model of a multilayer printed board.

FIG. 4 shows the power source layer 31 and the ground layer 32 of the multilayer printed board 30 divided into the rectangular metal patches 33 and 34 having an identical shape.

At step ST40 (FIG. 3), a rectangular conductive patch 36 (see FIGS. 4 to 5B) is formed that vertically extends from each side 35 of each metal patch 33 of the power source layer 31 toward the ground layer 32. The conductive patches 36 are not in contact with one another. Similarly, at step ST40, a rectangular conductive patch 38 is formed that extends vertically from each side 37 of each metal patch 34 of the ground layer 32 toward the power source layer 31. The conductive patches 38 are not in contact with one another. A corresponding two of the conductive patches 36 and 38 form a pair with a small gap between them.

Figure 5A:
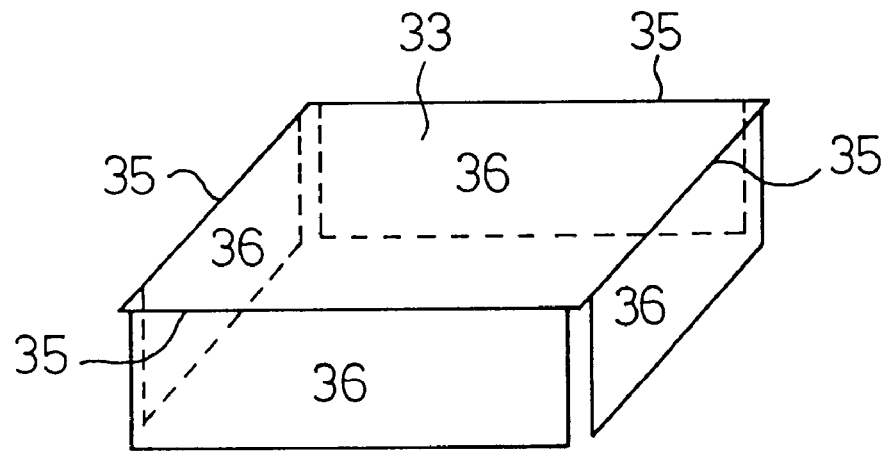
FIGS. 5A and 5B show conductive patches.
Figure 5B:
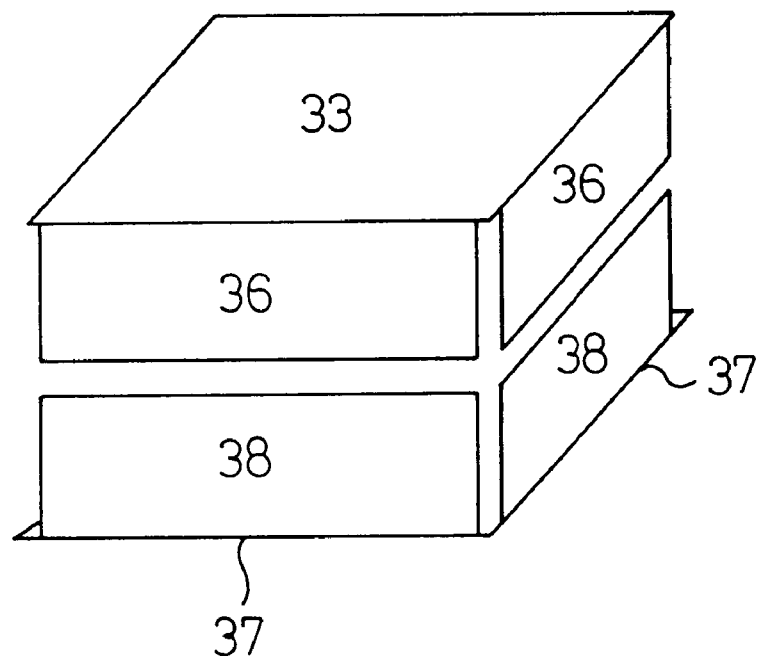

FIGS. 5A and 5B show the details of the metal patches and conductive patches. The rectangular conductive patches 36 vertically extend from the sides 35 of each metal patch 33 of the power source layer 31 toward the ground layer 32 so that the conductive patches 36 are not in contact with one another. The rectangular conductive patches 38 vertically extend from the sides 37 of each metal patch 34 of the ground layer 32 toward the power source layer 31 so that the conductive patches 38 are not in contact with one another. Each of the conductive patches 38 forms a pair with a corresponding one of the conductive patches 36 with a slight gap being present between them.

Figure 6A:
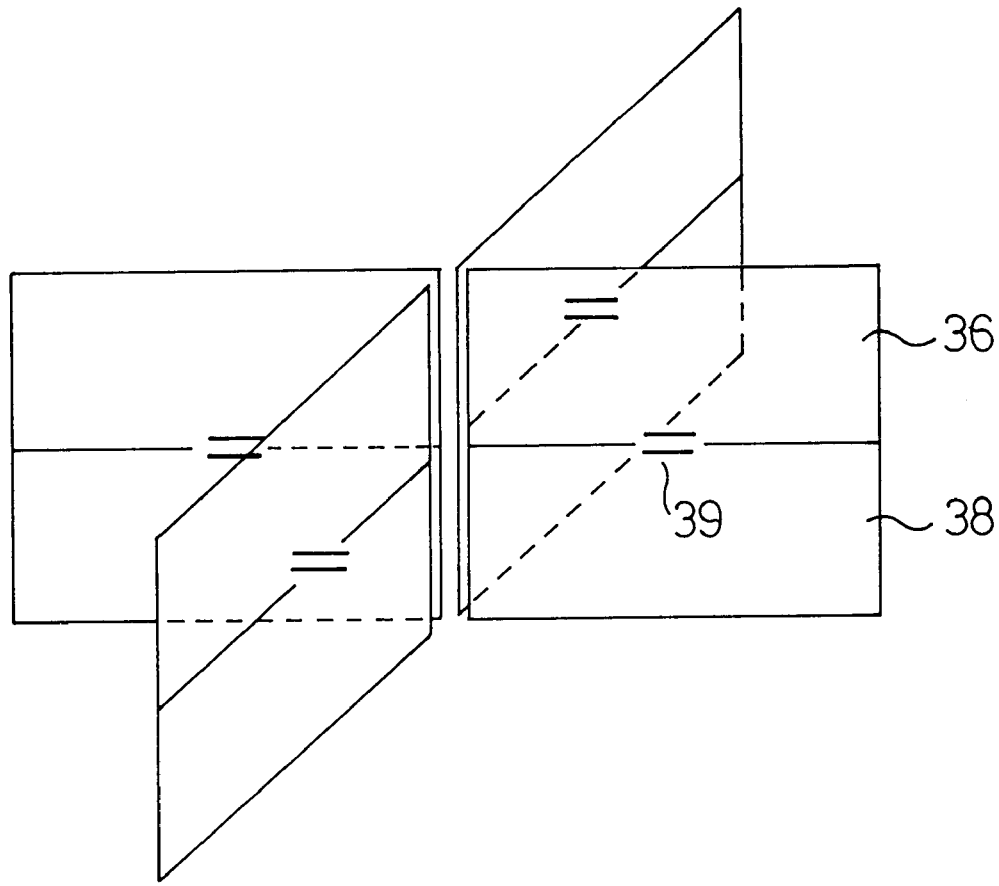
FIGS. 6A and 6B show models of a dielectric.

At step ST50, a capacitor model 39 is inserted between each pair of the conductive patches 36 and 38 as shown in FIG. 6A. It is preferable that the capacitor model 39 is positioned at the center of the conductive patches 36 and 38.

The capacitor model 39 has capacitance Cp, which is determined by C/N, where C is the capacitance of a capacitor formed by a dielectric sandwiched between the power source layer 31 and the ground layer 32, and N is the number of pairs formed with the conductive patches 36 and 38.

Figure 6B:
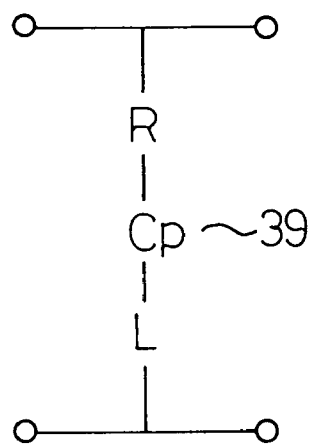

If it is necessary to consider a dielectric loss due to the dielectric sandwiched between the layers 31 and 32, to improve the accuracy of the model of the multilayer printed board, a resistance R and reactance L are connected to the capacitor 39 in series as shown in FIG. 6B.

At step ST60, a model of a noise source existing between the power source layer 31 and the ground layer 32 is formed. For this purpose, at step ST60, one of the metal patches 33 of the power source layer 31 at the position of the noise source is divided to form triangle patches 40, seen in FIG. 7. Similarly, at step ST60, the metal patch 34 of the ground layer 32 at the noise source is divided to form triangle patches 41. Then, at step ST60, a model 43 of the noise source is set between the apexes of the opposite triangle patches 40 and 41.

Figure 7:
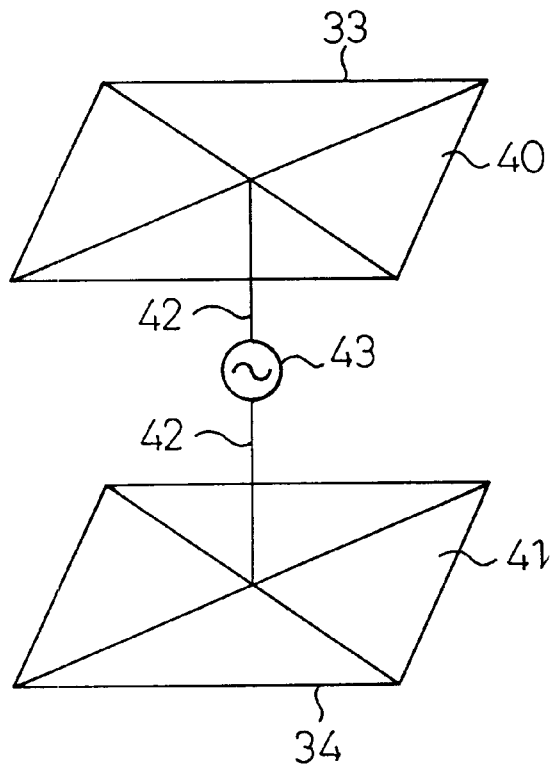
FIG. 7 shows a model of a noise source.

FIG. 7 shows the details of modeling the noise source. The noise source is located at, for example, a point A of FIG. 4. The metal patch 33 of the power source layer 31 at the point A is divided to form the triangle patches 40, and the metal patch 34 of the ground layer 32 at the point A is divided to form the triangle patches 41, shown in FIG. 7. Then, model 43 of the noise source is arranged between the apexes of the opposite triangle patches 40 and 41 with the use of metal wires 42.

Figure 8:
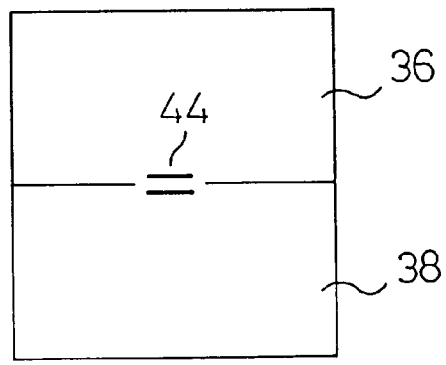
FIG. 8 shows a model of a bypass capacitor.

According to the structural data read out of the input data file 100, at step ST70, it is checked whether there is a bypass capacitor between the power source layer 31 and the ground layer 32. If there is a bypass capacitor, at step ST80, a model 44 of the bypass capacitor is arranged as shown in FIG. 8. The bypass capacitor model 44 is arranged at, for example, each point B of FIG. 4 between the corresponding conductive patches 36 and of FIG. 8. The capacitance of the bypass capacitor model 44 is specified by the structural data. It is preferable that the bypass capacitor model 44 is positioned at the center of the conductive patches 36 and 38.

If the process at step ST80 is finished, or if, at step ST10, it is determined that there is no multilayer printed board, or if, at step ST70, it is determined that there is no bypass capacitor, then the process proceeds to step ST90 to generate remaining parts, other than the power source layer and the ground layer, of the model of the target electric circuit apparatus.

In this way, the device 1 of the present invention follows the flowcharts of FIGS. 2 and 3 to prepare a model of a target electric circuit apparatus having a multilayer printed board that consists of a power source layer, a ground layer, and a dielectric sandwiched between the two layers. The prepared model includes the conductive patches 36 and 38, the capacitors 39, and the noise source 43. Based on this model, the present invention calculates the strength of an electromagnetic field radiated from the electric circuit apparatus according to the moment method.

To more precisely calculate the strength of the electromagnetic field, a loss due to the metal surface effect of the power source and ground layers must be considered. Namely, it is necessary to consider the thicknesses and materials of these layers. In this case, the metal patches 33 and 34 of the power source and ground layers are each considered to have a resistance value when calculating the strength of the electromagnetic field.

The flowcharts of FIGS. 2 and 3 are actually realized with a program, which is provided by means of a storage medium, is stored in the device 1, and is run in a memory.

The function of the model of the multilayer printed board simulated by the device for calculating electromagnetic field strength according to the present invention will now be explained.

Figure 9A:
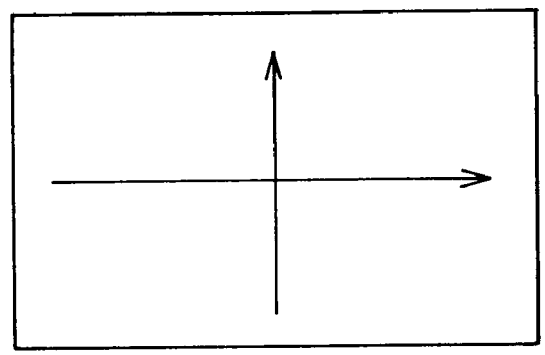
FIGS. 9A and 9B show the directions of currents flowing through a rectangular patch.

FIG. 9A shows one of the rectangular conductive patches 36 and 38 that form the model of the multilayer printed board generated by the apparatus 1 of the present invention. The conductive patch passes respective currents in parallel with the long and short sides thereof.

The currents can be calculated by obtaining a mutual impedance between opposite two patches.

Figure 9B:
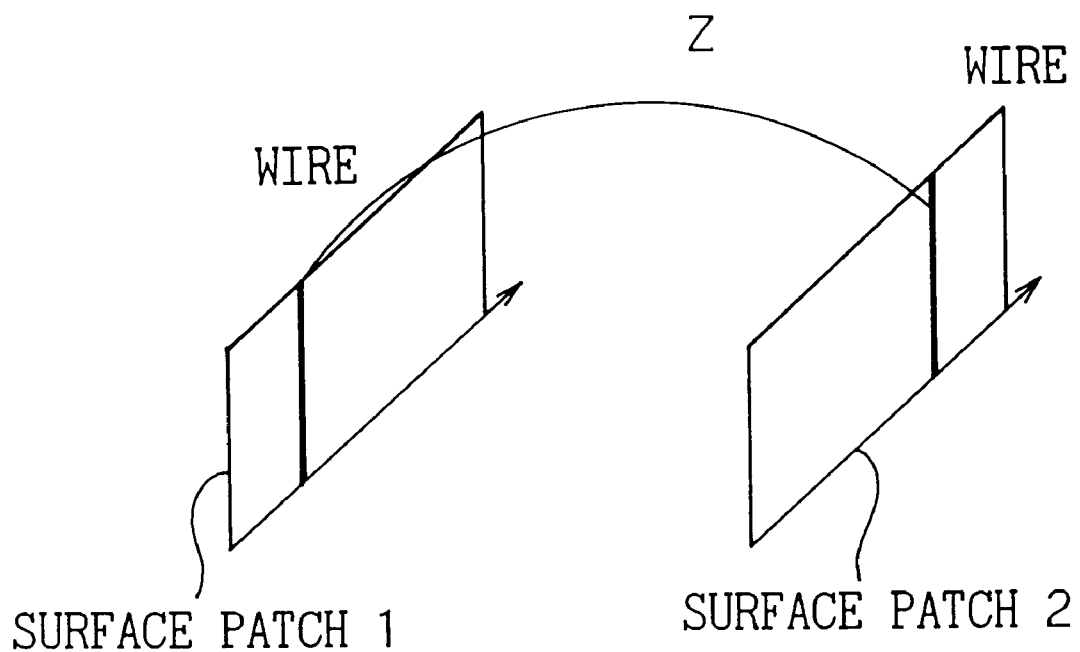

The mutual impedance between two-dimensional surface patches is efficiently obtained by integrating mutual impedance along a wire as shown in FIG. 9B. Thus, by assuming that each surface patch passes orthogonal currents as shown in FIG. 9A, the currents can be obtained by calculating the mutual impedance between the surface patches.

The dielectric sandwiched between the power source layer 31 and the ground layer 32 passes displacement currents from the power source layer 31 toward the ground layer 32. Accordingly, to precisely model the dielectric between the layers 31 and 32, it is necessary to take the displacement currents into account.

Figure 10:
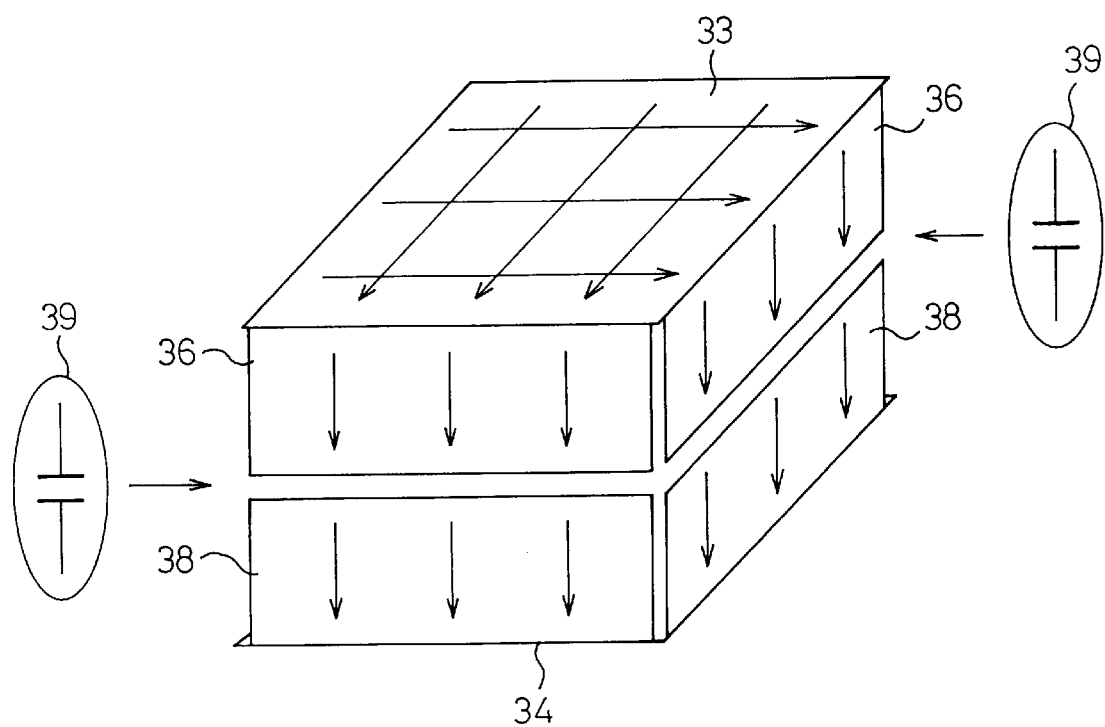
FIG. 10 shows the directions of currents flowing through conductive patches.

To achieve this, the present invention employs the conductive patches 36 that are not in contact with one another, as well as the conductive patches 38 that are not in contact with one another, as shown in FIG. 10, when modeling a multilayer printed board.

The adjacent conductive patches 36 extending from the power source layer 31 are disconnected from each other and, therefore, pass currents only from the power source layer 31 toward the ground layer 32. Similarly, the adjacent conductive patches 38 extending from the ground layer 32 are disconnected from each other and, therefore, pass currents only from the power source layer 31 toward the ground layer 32. The directions of these currents agree with the directions of the displacement currents passing through the dielectric sandwiched between the layers 31 and 32.

Figure 11:
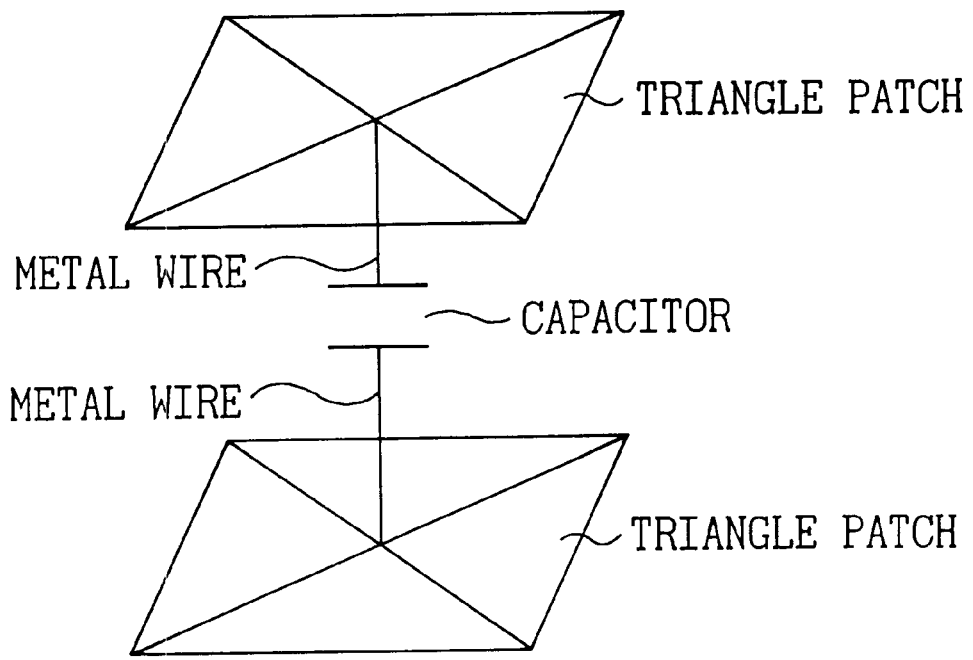
FIG. 11 shows another model of a dielectric.

Each of the conductive patches 36 and 38 is rectangular to two-dimensionally passing currents, which properly model the displacement currents. If instead of the conductive patches 36 and 38, the noise source model of FIG. 7 is applied to model the displacement currents, the result will be as shown in FIG. 11. The model of FIG. 11 hardly passes any currents and, therefore, does not resemble the displacement currents. Therefore, the noise source model is not preferable for the dielectric model.

In this way, the conductive patches 36 and 38 and capacitors 39 form an accurate model of the dielectric sandwiched between the layers 31 and 32 of the multilayer printed board 30.

This is the reason why the device 1 of the present invention employs the conductive patches 36 and 38 and capacitors 39 to model the dielectric disposed between the layers 31 and 32 of the multilayer printed board 30.

As shown in FIG. 7, in the device 1 of the present invention, a specific one of the metal patches 33 of the power source layer 31 is divided to form the triangle patches 40, and a specific one of the metal patches 41 of the ground layer 32 is divided to form the triangle patches 41. Between the apexes of the triangle patches 40 and 41, the noise source model 43 is connected by the use of the metal wire model 42.

Figure 12:
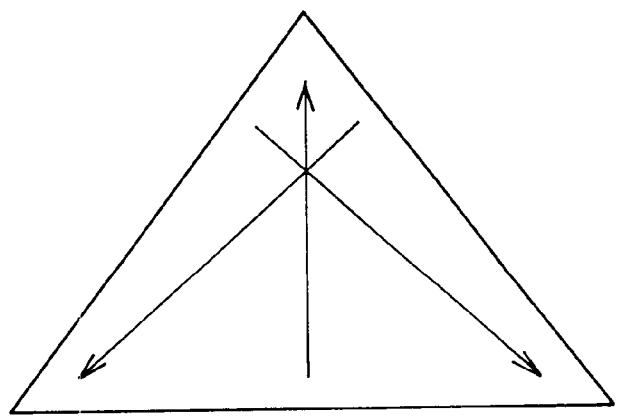
FIG. 12 shows the directions of currents flowing through a triangle patch.

In FIG. 12, the triangle patch passes currents to or from the apex thereof. Accordingly, the metal wire model 42 is useful to efficiently calculate mutual impedance.

It is impossible to connect the metal wire model 42 from the noise source model 43 to an optional point on one of the rectangular metal patches 33 and 34. This is because currents running to and from the metal wire model 42 are radially oriented around the connection point due to the characteristics of the currents. However, the rectangular patch passes no radial currents but passes only currents that are in parallel with the long and short sides thereof as shown in FIG. 9A.

Accordingly, in the device 1 of the present invention, the triangle patches 40 and 41 are formed to pass radial currents. The device 1 employs the noise source model 43 between the apexes of the triangle patches 40 and 41 with the use of the metal wire model 42. Thus the noise source model 43 is very accurate.

It is possible to optionally position the apexes of the triangle patches 40 and 41 on the metal patches 33 and 34, and therefore, the noise source is correctly modeled as the noise source model 43 at an appropriate position even if the metal patches 33 and 34 are large.

As shown in FIG. 8, a bypass capacitor may be arranged between the power source layer 31 and the ground layer 32. In this case, the device 1 of the present invention employs a bypass capacitor model 44 between a specific conductive patch 36 extending from the power source layer 31 and a corresponding conductive patch 38 extending from the ground layer 32.

In this way, in the device of the present invention, the conductive patches 36 and 38 are used to quickly model the bypass capacitor as the bypass capacitor model 44.

A test carried out to verify the effect of a model of a multilayer printed board, prepared according to the present invention, and a result of a test thereof will be explained.

Figure 13:
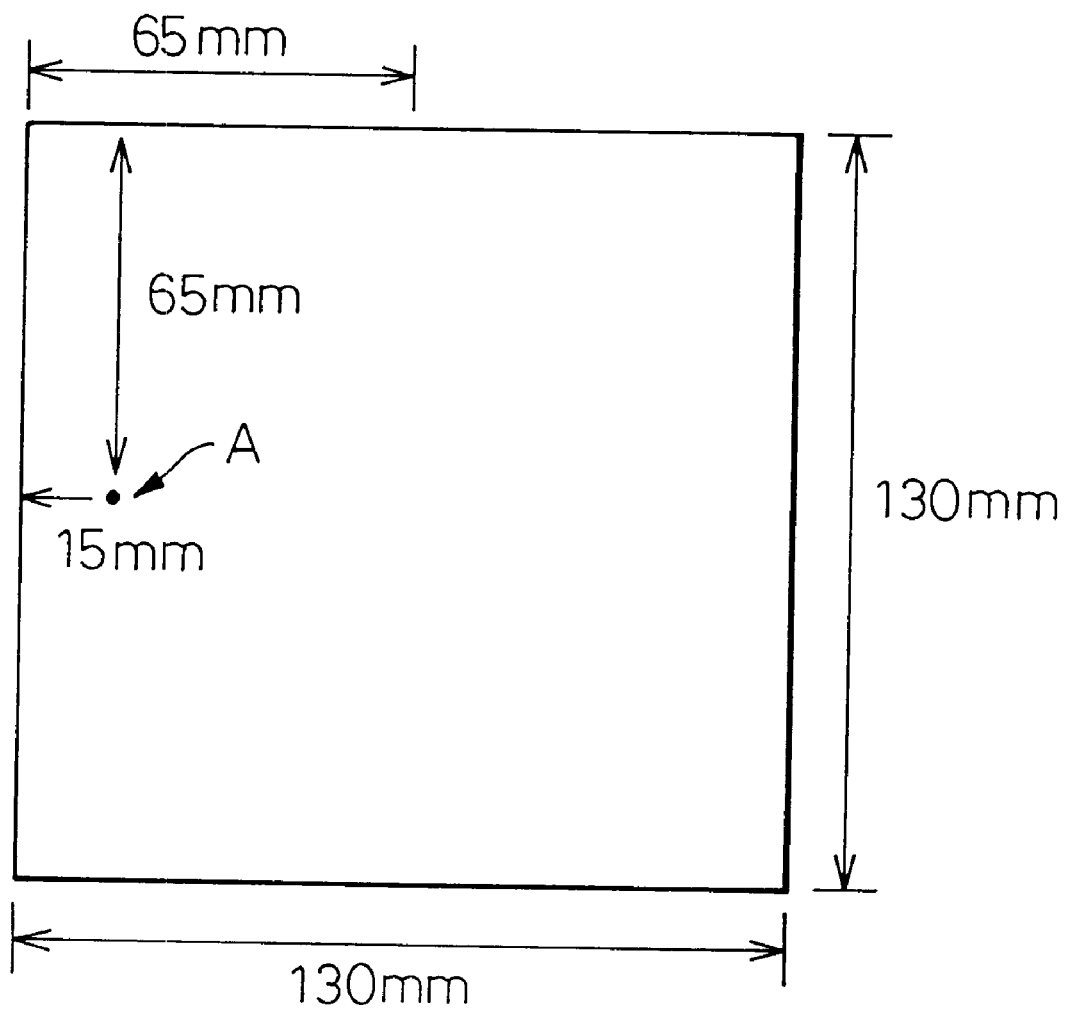
FIG. 13 shows a printed board for a test.

FIG. 13 shows a printed board used for the test. The printed board is 13 cm×13 cm (i.e., 130 mm×130 mm) in lateral dimensions and 0.9 mm in thickness and is made of glass epoxy resin having a dielectric constant $\epsilon_r$ of 4.7. Therefore, the board has a capacitance of 615 pF. The top and bottom faces of the printed board are each coated with copper foil. A model of this printed board was conceived according to the present invention, and at the same time, an actual board was made. An assumption was made that a noise source model for generating a sine wave of 1 V in effective value was connected, at a point A, between the top and bottom faces of the model board through a resistor of 50 Ω. At the same time, the noise source was actually prepared on the actual board. In the following explanation, the board model is called a test board.

In the test, the present invention applied the moment method to the model of the test board prepared according to the present invention, to calculate the impedance between the top and bottom faces of the model at the point A with respect to each noise frequency in the range of 20 MHz and 1000 MHz. Each mesh formed on the top and bottom faces of the model was 1 cm×1 cm.

Thereafter, a sine wave noise signal of 1 V in effective value was actually generated at each frequency in the range of 20 MHz to 1000 MHz and was applied to the top and bottom faces at the point A of the actual board. An impedance meter was used each time to measure the impedance between the top and bottom faces at the point A of the test board. The measured values were compared with the values calculated according to the present invention.

Figure 14:
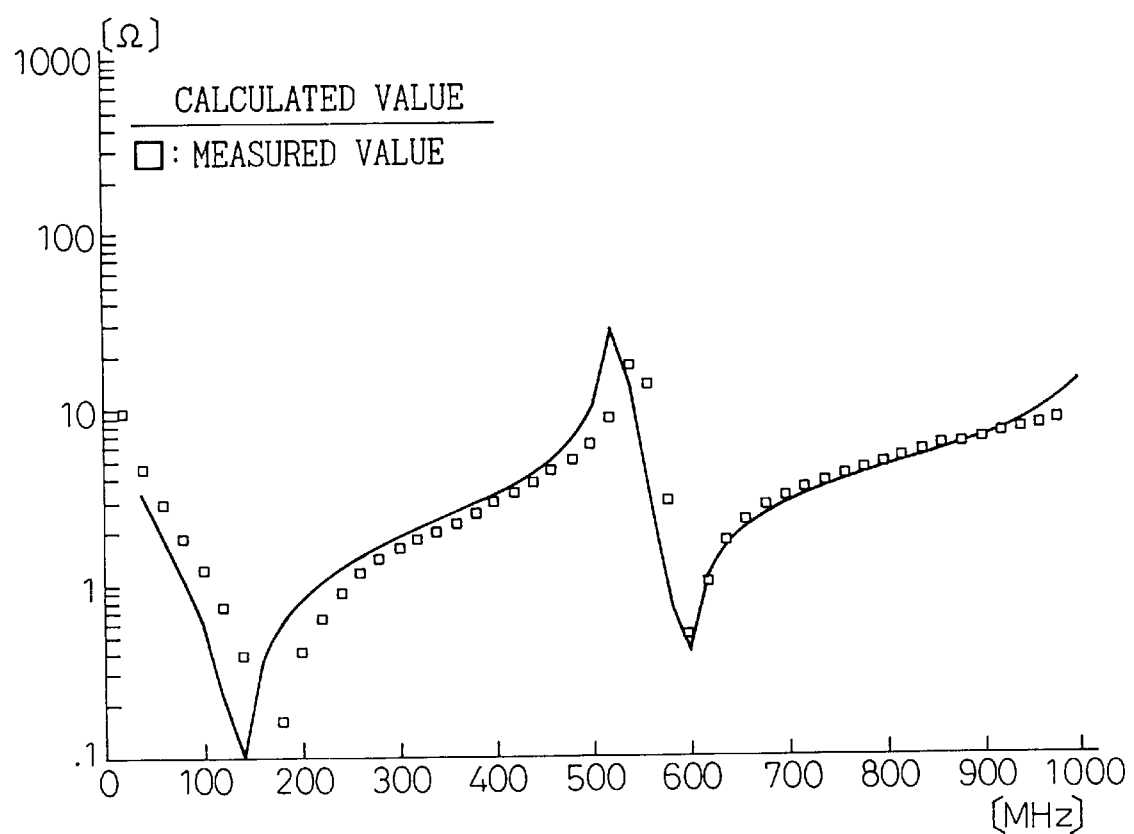
FIG. 14 shows a result of the test.
Figure 15A:
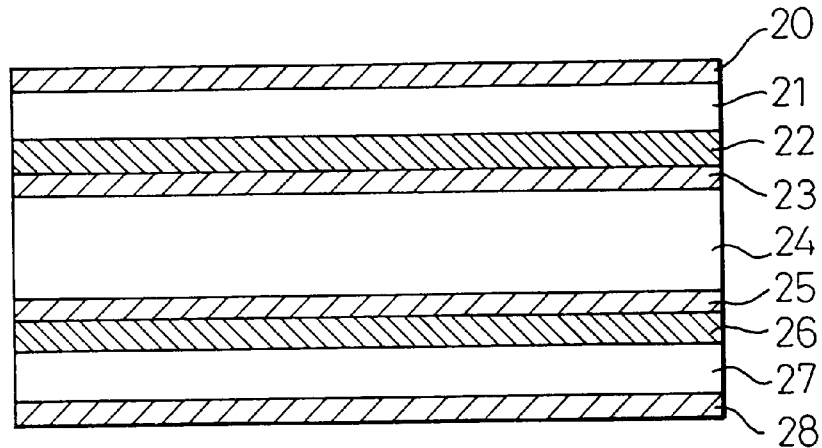
FIGS. 15A and 15B show a 4-layer printed board.
Figure 15B:
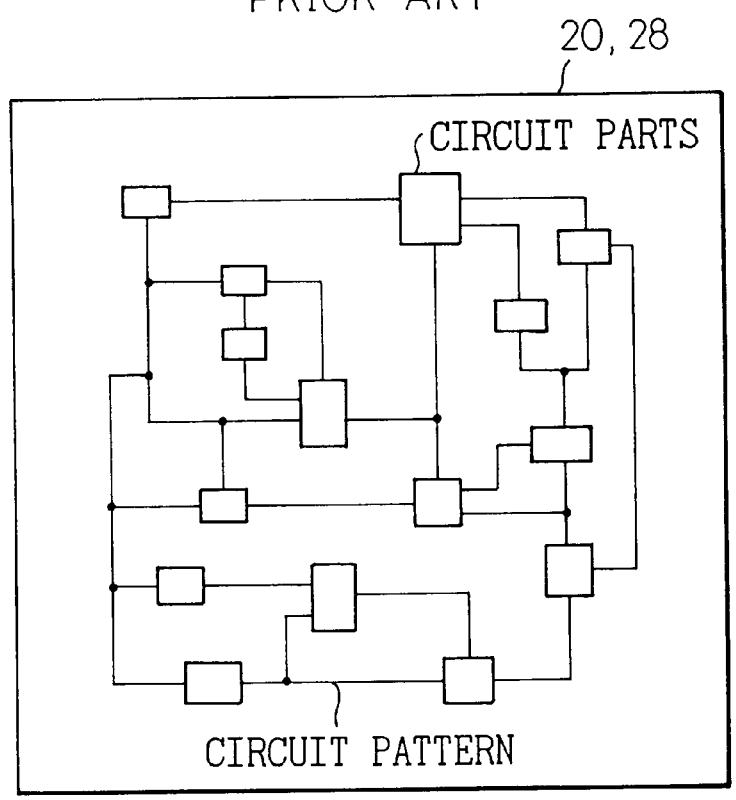
Figure 16:
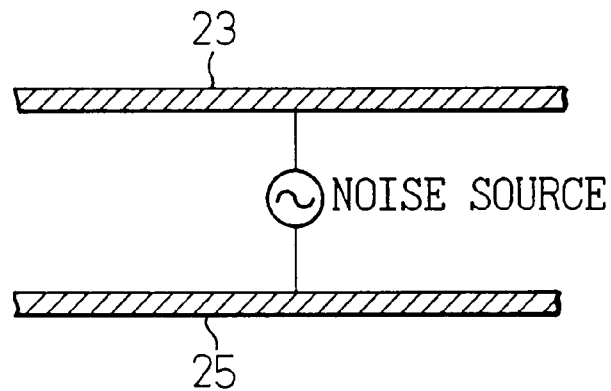
FIG. 16 shows a noise source.
Figure 17:
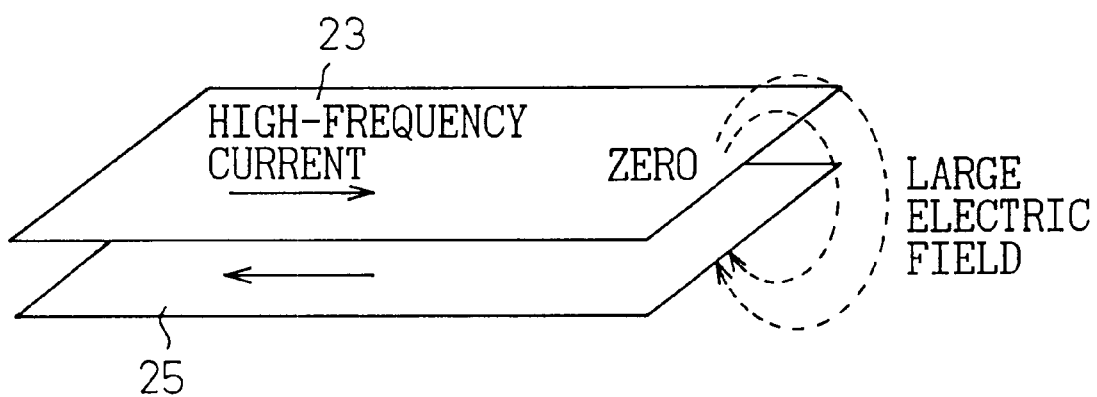
FIG. 17 shows a high-frequency current.

FIG. 14 shows a result of the test.

A continuous line represents the values calculated according to the moment method on the model of the present invention, and square marks represent the actual values measured with the impedance meter. The continuous line well agrees with the square marks, thereby varifying the effect of the model prepared according to the present invention.

As explained above, the device of the present invention accurately prepares a model of a multilayer printed board installed in a target electric circuit apparatus and, according to the moment method, calculates the strength of an electromagnetic field radiated from the electric circuit apparatus.

What is claimed is:

1. A device for calculating the strength of an electromagnetic field radiated from an electric circuit apparatus by using a moment method, comprising:

data receiving means for receiving structural data relating to the electric circuit apparatus;

extraction means for extracting, from the data receiving means, structural data related to a dielectric sandwiched between a power source layer and a ground layer of a multilayer printed board;

model generating means for generating, based on the structural data on the multilayer printed board, a model of the multilayer printed board; and calculating means for calculating, based on the model generated by the model generating means and using the moment method, the strength of an electromagnetic field radiated from the electric circuit apparatus;

said model generating means comprising:

first mesh generating means for generating a mesh of first metal patches generated by dividing the power source layer;

first conductive patch generating means for generating first conductive patches extending vertically from respective sides of each of the first metal patches toward the ground layer in such a way that the first conductive patches are not in contact with one another;

second mesh generating means for generating a mesh of second metal patches by dividing the ground layer;

second conductive patch generating means for generating second conductive patches, extending vertically from respective sides of each of the second metal patches toward the power source layer in such a way that the second conductive patches are not in contact with one another and a slight gap exists between each of the first conductive patches and the corresponding one of the second conductive patches; and capacitor model generating means for generating a capacitor model between each pair of corresponding first and the second conductive patches.

2. A device as claimed in claim 1, wherein said model generating means further comprises noise source model generating means for generating a noise source model by dividing a specific one of the first metal patches to form triangle patches, by dividing a corresponding one of the second metal patches to form triangle patches, and by arranging a noise source between the respective apexes of opposite triangle patches.

3. A device as claimed in claim 1, wherein said mode generating means further comprises at least one of resistance model generating means and reactance model generating means for generating at least one of, respectively, a resistance and a reactance connected in series with said capacitor model.

4. A device as claimed in claim 1, wherein said mode generating means further comprises bypass capacitor model generating means for generating a bypass capacitor model arranged between a specific pair of the first conductive patches and the second conductive patches.

5. A device as claimed in claim 1, wherein the calculation means comprises means for assuming that each of the first metal patches and the second metal patches has a resistance component.

6. A method of calculating the strength of an electromagnetic field radiated from an electric circuit apparatus according to a moment method, comprising the steps of:

receiving structural data relating to the electric circuit apparatus;

extracting, from the structural data, specific structural data related to a dielectric sandwiched between a power source layer and a ground layer of a multilayer printed board;

generating, based on the structural data on the multilayer printed board, a model of the multilayer printed board;

calculating, based on the generated model, the strength of an electromagnetic field radiated from the electric circuit apparatus by using the moment method; and said model generating step further comprises:
generating a mesh of first metal patches generated by dividing the power source layer,
generating first conductive patches extending vertically from respective sides of each of the first metal patches toward the ground layer in such a way that the first conductive patches are not in contact with one another,
generating second metal patches by dividing the ground layer;
generating second conductive patches vertically extending from respective sides of each of the second metal patches toward the power source layer in mutually spaced relationship such that the second conductive patches are not in contact with one another and are spaced by a slight gap from the respectively corresponding second conductive patches, and
arranging a capacitor model between each pair of first and the second conductive patches.

7. A storage medium storing a program that calculates the strength of an electromagnetic field radiated from an electric circuit apparatus according to a moment method, the program comprising:

data receiving means for receiving structural data relating to the electric circuit apparatus;

extraction means for extracting, from the data receiving means, structural data related to a dielectric sandwiched between a power source layer and a ground layer of a multilayer printed board;

model generating means for generating, based on the structural data on the multilayer printed board, a model of the multilayer printed board;

calculating means for calculating, based on the model generated by the model generating means and using the moment method, the strength of an electromagnetic field radiated from the electric circuit apparatus by using the moment method; and said model generating means comprises:
first mesh generating means for generating a mesh of first metal patches generated by dividing the power source layer,
first conductive patch generating means for generating first conductive patches extending vertically from respective sides of each of the first metal patches toward the ground layer in such a way that the first conductive patches are not in contact with one another,
second mesh generating means for generating a mesh of second metal patches by dividing the ground layer,
second conductive patch generating means for generating second conductive patches, extending vertically from respective sides of each of the second metal patches toward the power source layer in mutually spaced relationship such that the second conductive patches are not in contact with one another and are spaced by a slight gap from the respectively corresponding second conductive patches, and
capacitor model generating means for generating a capacitor model between each pair of corresponding first and the second conductive patches.

8. A device as claimed in claim 2, wherein said mode generating means further comprises at least one of resistance model generating means and reactance model generating means for generating at least one of, respectively, a resistance and a reactance connected in series with said capacitor model.

* * * * *